United States Patent [19]

Harvey et al.

[11] 4,281,905
[45] Aug. 4, 1981

[54] MAGNETO-OPTIC LIGHT DEFLECTOR BEAM RECOMBINATION APPARATUS

[75] Inventors: William A. Harvey; Ernest J. Torok, both of Minneapolis, Minn.

[73] Assignee: Sperry Corporation, New York, N.Y.

[21] Appl. No.: 108,917

[22] Filed: Dec. 31, 1979

[51] Int. Cl.³ .................. G02F 1/31; G02B 27/10
[52] U.S. Cl. ........................ 350/377; 350/174; 350/436
[58] Field of Search ........... 350/151, 96.13–96.14, 350/174, 162 R, 54, 376, 77; 356/305, 334, 328–329, 247, 353; 250/237 R, 237 G

[56] References Cited

U.S. PATENT DOCUMENTS

| 3,611,181 | 10/1971 | Lary et al. ............... 350/162 R |
| 3,752,563 | 8/1973 | Torok et al. ............... 350/151 |
| 3,768,889 | 10/1973 | Cox ............... 350/54 |
| 3,905,675 | 9/1975 | McCracken ............... 350/54 |

FOREIGN PATENT DOCUMENTS 1020797  12/1957  Fed. Rep. of Germany ........... 356/382

OTHER PUBLICATIONS

Malfeld, O., "Telecentric Imagery by Means of Optical Systems for Measuring Apparatus", Micro Technic, vol XI, #5, 1957, pp. 216–222.

Mazumder, M. K., "Laser Doppler Velocity Measurement without Directional Ambiguity by Using Frequency Shifted Incident Beams", App. Phys. Lett. 6–1-79, pp. 462–464.

*Primary Examiner*—William H. Punter
*Attorney, Agent, or Firm*—Kenneth T. Grace; William E. Cleaver; Marshall M. Truex

[57] ABSTRACT

An apparatus for and a method of parallelizing the conjugate deflected light beams of a magneto-optic light deflector system. The apparatus includes two converging half-lenses, the centers of which are removed. The two converging half-lenses are oriented superposed with their centers aligned along the center of the light beam that is directed normally incident to the plane of the magneto-optic light deflector. A converging lens is oriented in the optic axes of the parallelized conjugate light beams for focusing the two parallelized conjugate light beams upon a screen or detector.

5 Claims, 6 Drawing Figures

4,281,905

MAGNETO-OPTIC LIGHT DEFLECTOR BEAM RECOMBINATION APPARATUS

BACKGROUND OF THE INVENTION

In the E. J. Torok, et al, U.S. Pat. No. 3,752,563 there is illustrated a magneto-optic light deflector system that utilizes the stripe domains in a magnetic film as a diffraction grating. The angle of deflection of the light beam from the plane of the film is varied by varying the intensity of a DC field in the plane of the film or by varying the intensity of the DC field normal to the plane of the film. The orientation of the stripe domains is varied by varying the direction of the DC field in the plane of the film while the film hysteresis is overcome by an AC tickle field that is oriented perpendicular to the stripe domains. The normally incident light beam is diffracted by the film-forming diffraction grating to generate a single 0'th order light beam, which is oriented along the optical axis of the normally incident light beam, and a pair of conjugate 1'st order light beams, which are the light beams that are deflected along the new optical axes. One of the 1'st order light beams is called the primary deflected light beam, while the other is called the conjugate deflected light beam, each of the 1'st order light beams containing 50% of the total deflected light intensity that is directed along the two conjugate optical axes.

In the G. F. Sauter, et al, U.S. Pat. No. 4,148,556 there is illustrated a magneto-optic light deflection system that utilizes the magnetic film diffraction grating of the E. J. Torok, et al, U.S. Pat. No. 3,752,563, but in which the light is transmitted by optical fiber transmission lines. In this magneto-optic light deflection system, a light beam is directed normally incident to the first surface of the magnetic film by an input optic fiber and is coupled to selected ones of output optic fibers on the second and opposite surface of the magnetic film by applying the desired magnetic fields to the magnetic film. Conjugate reflected light beams are, via their associated output optic fibers, added together by an optic coupler to provide a single output fiber having the sum of the light intensity in both of the associated output fibers. The present invention is directed toward an apparatus for and a method of combining the conjugate deflected light beams by first parallelizing and then combining them using lenses and without the losses and restrictions due to the use of optic fiber transmission lines.

SUMMARY OF THE INVENTION

The magneto-optic light deflector system of the present invention includes two converging half-lenses of equal focal lengths, that may be formed from a single circular converging lens, a circular center portion may be removed and which then may be cut in half along a diameter. The two converging half-lenses are oriented: superposed with their optical axes common and orthogonal to the plane of the magneto-optic light deflector; with their optical axes aligned with the of the optical axis light beam that is directed normally incident to the plane of the magneto-optic light deflector; with the two converging half-lenses separated from each other by a distance equal to twice the focal length of a single converging half-lens; and the converging half-lens located nearest the plane of the magneto-optic light deflector may be separated from the magneto-optic light deflector by a distance equal to the focal length of a single converging half-lens. An additional converging lens may be oriented in the optical axis of the parallelized conjugate light beams with its optical axis parallel thereto for focusing the two parallelized conjugate light beams upon a screen or detector that is located at the converging lens's focal plane.

DESCRIPTION OF THE PREFERRED EMBODIMENT

Figure 1:
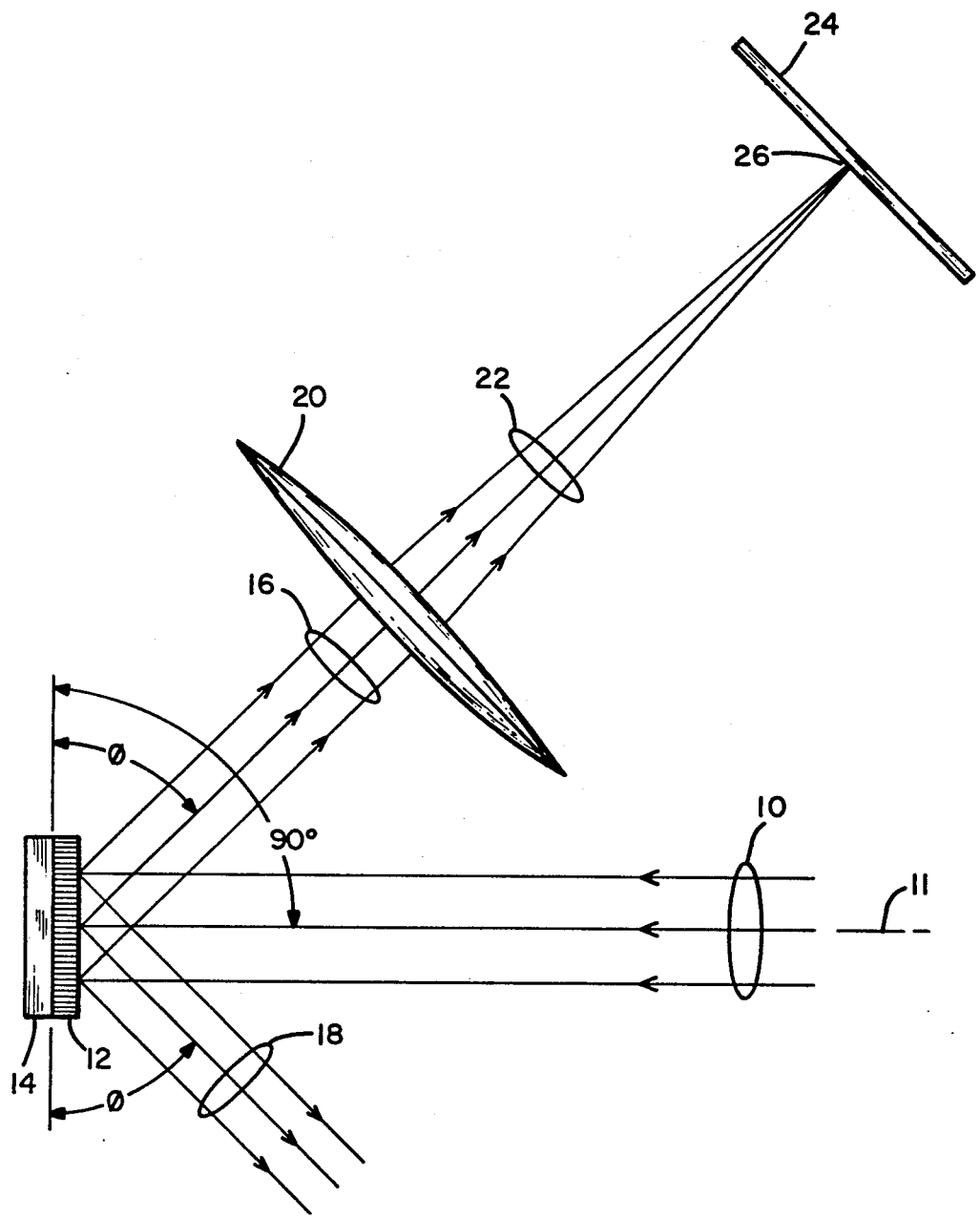
FIG. 1 is a diagrammatic illustration of a prior art magneto-optic light deflector system.

With particular reference to FIG. 1, there is presented a diagrammatic illustration of a prior art magneto-optic light deflection system. In this magneto-optic light deflector system a relatively wide light beam 10 is directed normally incident upon the near surface of the magnetic film 12 that utilizes a plurality of stripe domains to function as a diffraction grating. The deflector 12 has, on its far side, a mirror 14 of substantially 100% reflectivity whereby the portion of the light beam 10 that passes therethrough is reflected back through the diffraction grating forming magnetic film 12. The angle of deflection of the light beam from the plane of the magnetic film is varied in two dimensions by varying the separation and orientation of the stripe domains of the stripe domain Faraday effect magnetic film. By coating the far surface of the magnetic film 12 by the mirror 14, the light that passes through each stripe domain is reflected by the high reflectivity mirror 14 and is passed back out the magnetic film 12 thereby gaining twice the Faraday rotation. The magnetic film 12 diffracts the incident light beam 10 forming a single 0'th order light beam that is directed back along the optical axis 11 of the incident light beam 10 and additionally generates two conjugate 1'st order light beams 16 and 18, the angular orientation $\phi$ of which is determined by the orientation and intensity of the magnetic field coupled to magnetic film 12. Light beam 16 is described as the primary deflected light beam while light beam 18 is described as the conjugate light beam both generated from the incident light beam 10 acting upon the magnetic film 12 and the mirror 14 on the far side thereof. In this magneto-optic light deflector system, only the primary deflected light beam 16 is directed normally incident upon a long focal length lens 20 to be emitted therefrom as a converging light beam 22 which converges at a point 26 upon screen 24. Because the conjugate light beam 18 is not utilized and because 50% of the total at order deflected light intensity is in each of the conjugate 1'st order light beams 16 and 18, 50% of the light energy from light beam 10 that is deflected by magnetic film 12 is wasted in this system.

Figure 2:
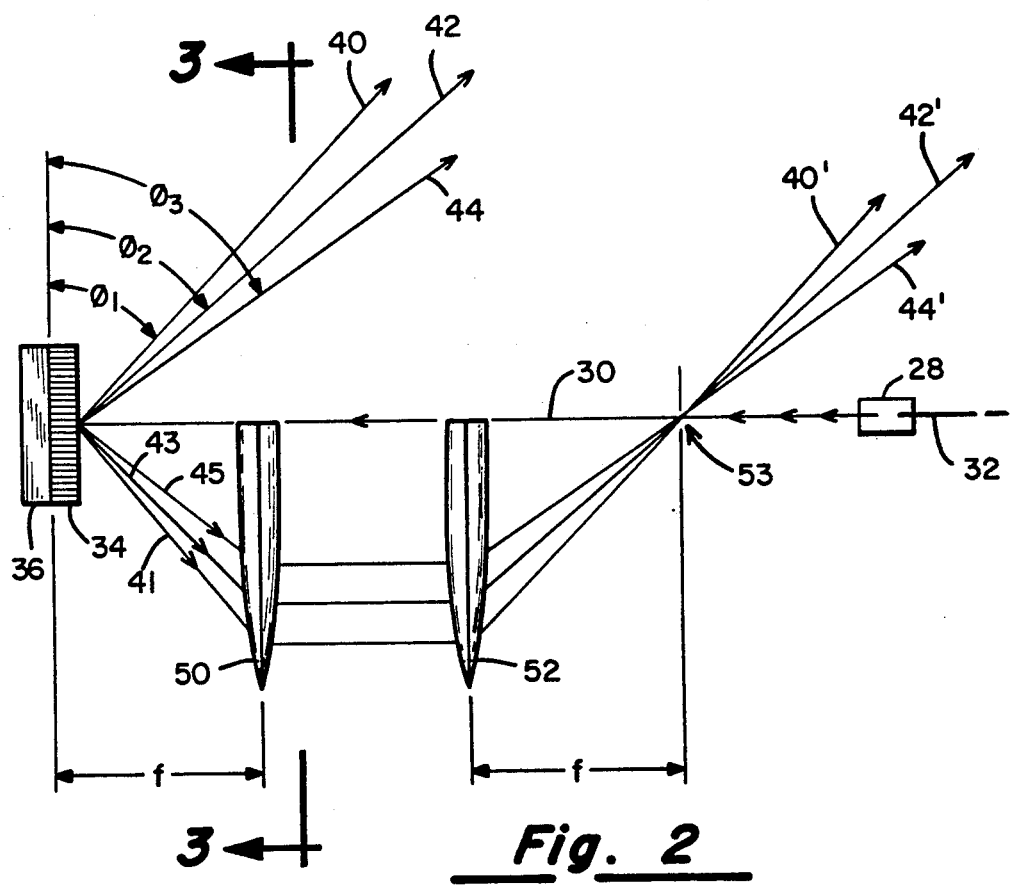
FIG. 2 is a diagrammatic illustration of a magneto-optic light deflector system incorporating the present invention for three different narrow light beam deflection angles.

With particular reference to FIG. 2 there is presented a diagrammatic illustration of a magneto-optic light deflector system incorporating the present invention for three different narrow light beam deflection angles. In this embodiment, the ray of incoming light 30 from source 28 is directed normally incident upon the near surface of magnetic film 34 along its optical axis 32. At three different times and with three different magnetic field intensities coupled to thin film 34, thin film 34 and mirror 36 generate primary light rays 40, 42 and 44 and their conjugate light rays 41, 43 and 45, respectively, at the associated different deflection angles $\phi_1$, $\phi_2$ and $\phi_3$, respectively. Two converging half-lenses 50 and 52, which are formed from a single circular converging lens, a circular center portion of which is removed, and which is then cut in half along a diameter are oriented superposed with their optical axes orthogonal to the plane of the magnetic film 34, with their optical axes aligned with the center, or optical axis 32, of the normally incident light ray 30. Converging half-lens 50 is positioned its focal length away from the plane of the magnetic film 34, causing the three conjugate light rays 41, 43 and 45 to emerge parallel to the incoming ray. These conjugate light rays 41, 43 and 45 are directed upon converging half-lens 52 which causes each of the conjugate light rays 41, 43 and 45 to pass through the focal point 53 of lens 52 and thus to be parallel to the associated primary light rays 40, 42 and 44, respectively, forming the conjugate light rays 40', 42' and 44' which are now parallel to their associated primary light rays 40, 42 and 44, respectively.

Figure 3:
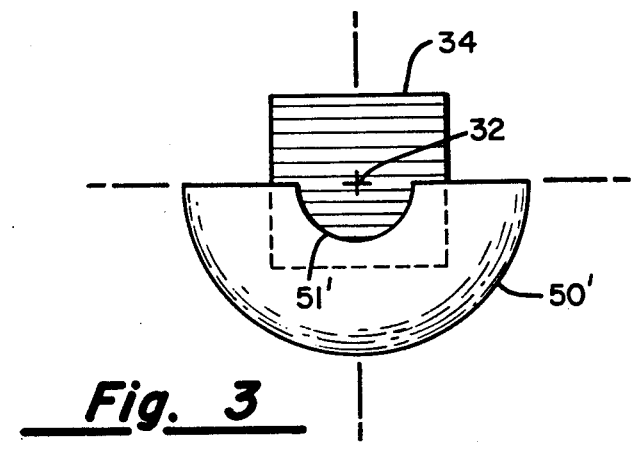
FIG. 3 is a diagrammatic illustration of a view of the magneto-optic light deflection system of FIG. 2 taken along line 3—3 thereof.

With particular reference to FIG. 3 there is illustrated a diagrammatic illustration of a view of the magneto-optic light deflector system of FIG. 2 taken along line 3—3 thereof. FIG. 3 illustrates that converging half-lens 50 is oriented with its optical axis aligned to coincide with the center of the light beam 30 that is directed normally incident to the plane of the magnetic film 34, which center is identified as the optical axis 32. Also illustrated is the semicircular opening 51 in converging half-lens 50, in which the lines or surfaces 50', 51' are illustrated as being concentric about the optical axis 32.

Figure 4:
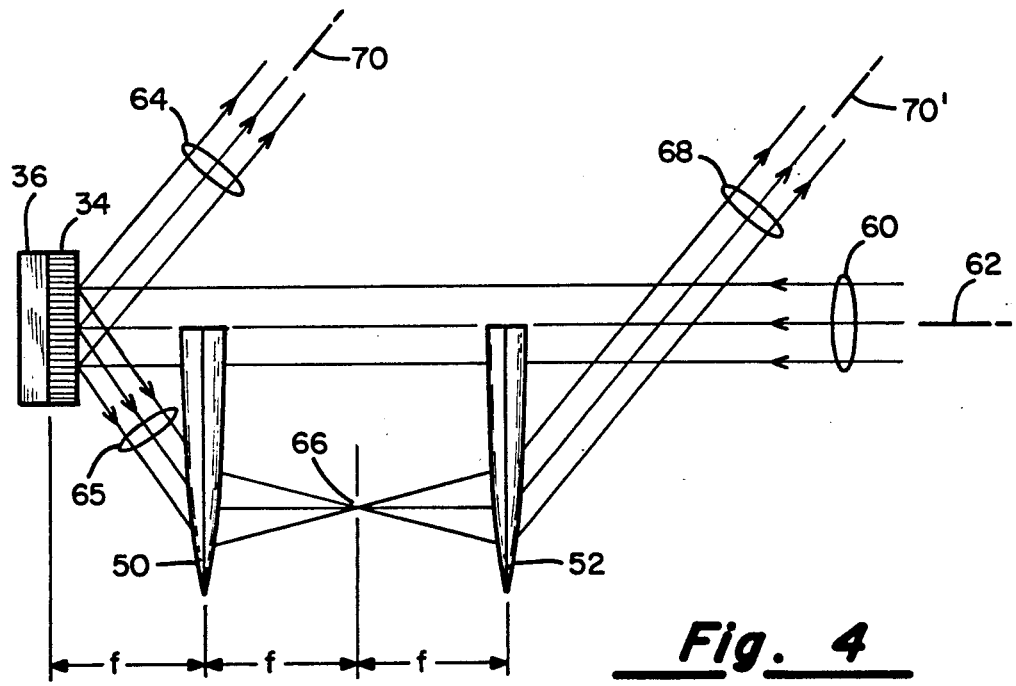
FIG. 4 is a diagrammatic illustration of the embodiment of FIG. 2 for a single wide light beam.

With particular reference to FIG. 4, there is presented a diagrammatic illustration of the embodiment of FIG. 2 for a single wide light beam. Because real light beams have a finite cross-section, i.e., are relatively wide, FIG. 4 illustrates that for a practical embodiment of FIG. 3, the two converging half-lenses 50 and 52 must be separated two focal lengths apart. This is because the relatively wide incoming light beam 60 that is directed normal to the surface of magnetic film 34 along its optical axis 62 when diffracted by magnetic film 34 and mirror 36 generates the relatively wide primary deflected light beam 64 and its conjugate deflected light beam 65. Converging half-lens 50 then converges the relatively wide conjugate light beam 65 to a point 66 which is on the focal plane half-way between converging half-lenses 50 and 52, and converging half-lens 52, in the converse manner, collimates the relatively wide diverging conjugate light beam 65 into the relatively wide parallelized conjugate light beam 68 which is directed along an optical axis 70' that is parallel to the optical axis 70 of primary deflected light beam 64.

Figure 5:
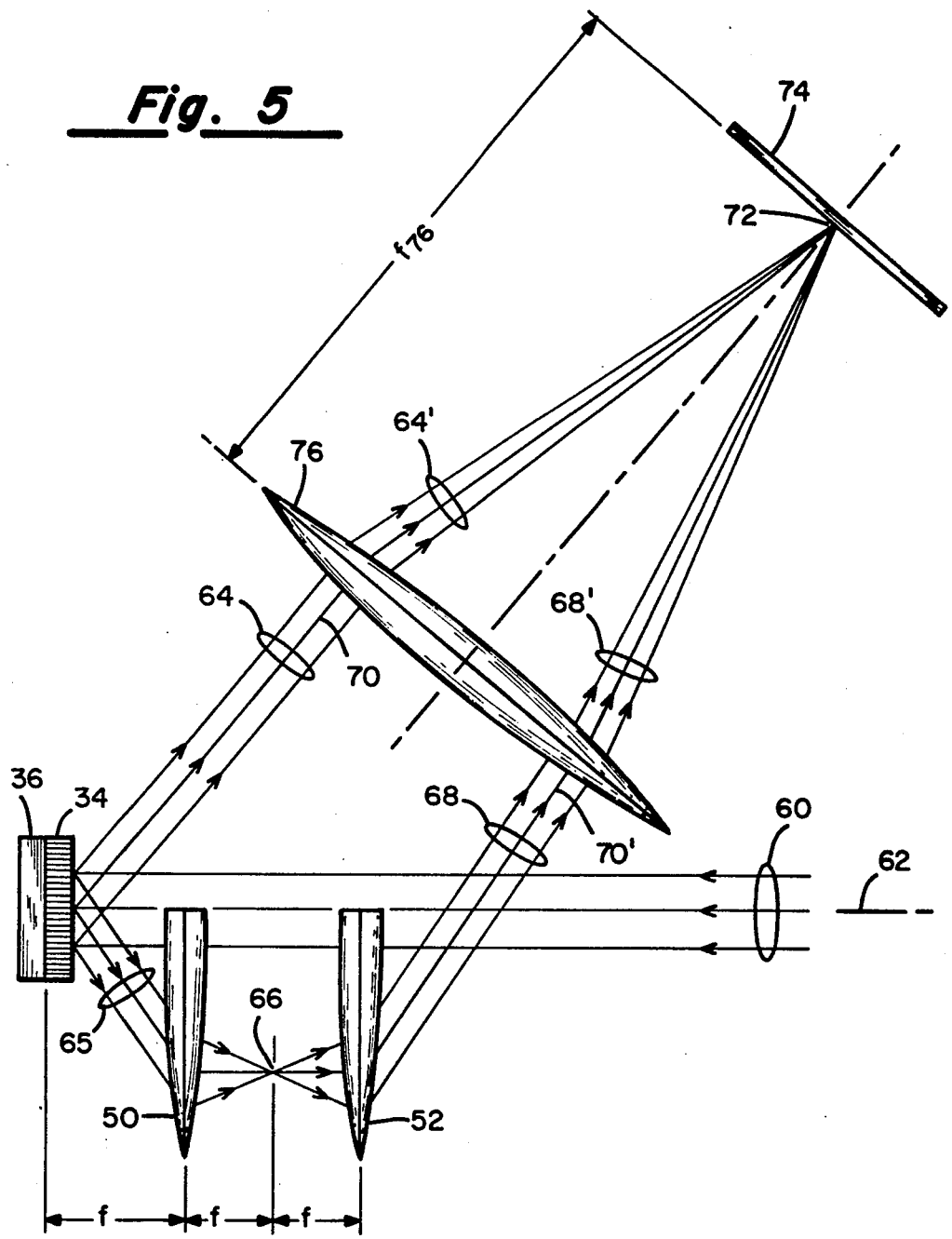
FIG. 5 is a diagrammatic illustration of the embodiment of FIG. 4 incorporating a parallelizing long focal length lens and a display screen for combining and displaying two conjugate light beams.

With particular reference to FIG. 5 there is presented a diagrammatic illustration of the embodiment of FIG. 4 incorporating a parallelizing long focal length lens 76 and a display screen 74 for combining and displaying two conjugate light beams. In this embodiment, the primary deflected light beam 64 and the parallelized conjugate light beam 68 are directed normally incident upon a converging lens 76 having the long focal length $f_{76}$. Converging lens 76 focuses the emerging primary deflected light beam 64' and the parallelized conjugate deflected light beam 68' upon a point 72 on a screen 74 that is oriented in the focal plane of converging lens 76.

Figure 6:
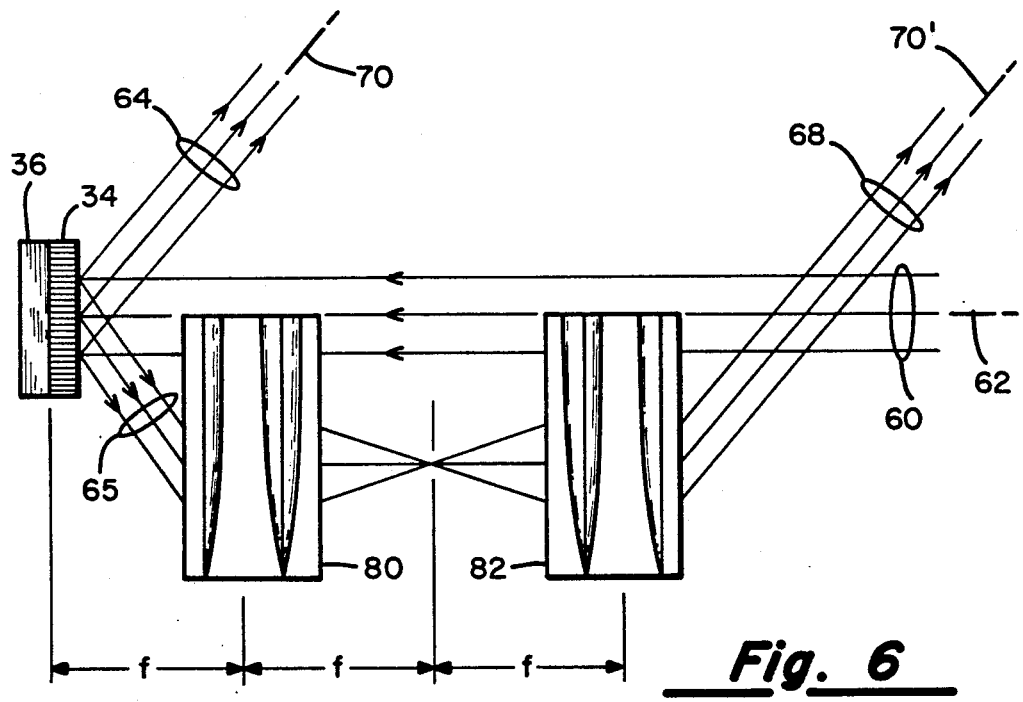
FIG. 6 is a diagrammatic illustration of the embodiment of FIG. 4 incorporating two converging half-lenses of a different design.

With particular reference to FIG. 6 there is presented a diagrammatic illustration of the embodiment of FIG. 4 incorporating two converging compound half-lenses. Compound lenses 80 and 82 are of identical design. Compound lenses 80 and 82 were found to produce substantially reduced lense aberrations and produced a more sharply defined point 72 on screen 74 as illustrated in FIG. 5.

What is claimed is:
1. A light deflection system, comprising:
a diffraction grating;
a source of an input light beam that is directed normally incident to the near surface of said diffraction grating and along an input optical axis;
a mirror on the far side of said diffraction grating reflecting said input laser light beam back through said diffraction grating for generating a single 0'th order light beam directed back along said input optical axis and a pair of conjugate 1'st order light beams;
a pair of converging half-lenses that are formed from a single converging lens the center of which is removed and which is then cut in half along a diameter;
said two converging half-lenses oriented superposed with their planes parallel to the plane of said diffraction grating, with their optical axes aligned with said input optical axis, with the nearest converging half-lens located one focal length away from the plane of said diffraction grating and the two converging half-lenses separated two focal lengths.

2. A light deflection system, comprising:
a Faraday effect magnetic film having a plurality of parallel stripe domains therein for forming a diffraction grating;
a source of an input laser light beam that is directed normally incident to the near surface of said diffraction grating and along an input optical axis;
a substantially 100% reflecting mirror on the far side of said diffraction grating reflecting said input laser light beam back through said diffraction grating for generating a single 0'th order light beam directed back along said input optical axis and a pair of conjugate 1'st order light beams, defined as a primary deflected light beam and a conjugate deflected light beam, that are deflected an angle $\phi$ from the plane of said diffraction grating where $\phi$ is between 0° and 90°;
a pair of converging half-lenses that are formed from a single circular converging lens a circular center portion of which is removed and which is then cut in half along a diameter;
two converging half-lenses oriented superposed with their planes parallel to the plane of the diffraction grating, with their optical axes aligned with said input optical axis, with the nearest half-lens located one focal length away from the plane of said diffraction grating and the two converging half-lenses separated two focal lengths.

3. A light deflection system, comprising:

a source of an input light beam that is directed along an input optical axis;

diffraction grating means, oriented with said input optical axis normally incident to the plane of said diffraction grating means, for generating from said input light beam a single 0'th order light beam along said input optical axis, and a pair of conjugate 1'st order light beams;

a pair of converging half-lenses that are formed from a single converging lens the center of which is removed and which is then cut in half along a diameter;

said two converging half-lenses oriented superposed with their planes parallel to the plane of said diffraction grating, with their centers aligned with said input optical axis, with the nearest converging half-lens located one focal length away from the plane of said diffraction grating and the two converging half-lenses separated two focal lengths.

4. An apparatus for parallelizing the two 1'st order light beams generated by a diffraction grating from a normally incident light beam comprising:

a source of an input light beam that is directed along an input optical axis;

diffraction grating means, oriented with said input optical axis normally incident to the plane of said diffraction grating means, for generating from said input light beam a single 0'th order light beam directed along said input optical axis and a pair of conjugate 1'st order light beams;

a pair of converging half-lenses that are formed from a single circular converging lens which has a circular portion removed from the center thereof and which is then cut in half along a diameter;

said two converging half-lenses oriented superposed with their planes parallel to the plane of said diffraction grating with their optical axes aligned with said input optical axis for having said input laser light beam pass through the opening formed by said removed circular portion with the nearest converging half-lens located one focal length away from the plane of said diffraction grating and the two converging half-lenses separated two focal lengths; and one of said 1st order light beams directed by said diffraction grating upon said nearest converging half-lens, thence upon the farthest converging half-lens to be refracted by said farthest converging half-lens to be parallel to the other one of said 1'st order light beams.

5. An apparatus for parallelizing the two 1'st order light beams generated by a diffraction grating from a normally incident input light beam, comprising:

a diffraction grating;

a source of an input light beam that is directed normally incident to the near surface of said diffraction grating and along an input optical axis;

a mirror on the far side of said diffraction grating reflecting said input laser light beam back through said diffraction grating for generating a single 0'th order light beam directed back along said input optical axis and a pair of conjugate 1'st order light beams;

a pair of converging half-lenses that are formed from a single circular converging lens which has a circular portion removed from the center thereof and which is then cut in half along a diameter;

said two converting half-lenses oriented superposed with their planes parallel to the plane of said diffraction grating with their optical axis aligned with said input optical axis for having said input laser light beam pass through the opening formed by said removed circular portion with the nearest converging half-lens located one focal length away from the plane of said diffraction grating and the two converging half-lenses separated two focal lengths; and one of said 1'st order light beams directed by said diffraction grating upon said nearest converging half-lens, thence upon the farthest converging half-lens to be refracted by said farthest converging half-lens to be parallel to the other one of said 1'st order light beams.

* * * * *

UNITED STATES PATENT AND TRADEMARK OFFICE
CERTIFICATE OF CORRECTION

PATENT NO. : 4,281,905

DATED : 8-4-81

INVENTOR(S) : W. A. HARVEY, et al

It is certified that error appears in the above-identified patent and that said Letters Patent are hereby corrected as shown below:

IN THE CLAIMS

Claim 4, Column 6, Line 4 - "1st" should be -- 1'st --

Claim 5, Column 6, Line 28, "converting" should be -- converging --.

Signed and Sealed this

Ninth Day of March 1982

[SEAL]

Attest:

GERALD J. MOSSINGHOFF

Attesting Officer   Commissioner of Patents and Trademarks